Patented July 18, 1950

2,515,646

UNITED STATES PATENT OFFICE 2,515,646

POLYMERIZATION BY MEANS OF STANNIC CHLORIDE

David F. Gould, Riverton, N. J., assignor to Allied Chemical & Dye Corporation, New York, N. Y., a corporation of New York No Drawing. Application March 21, 1946, Serial No. 656,153

5 Claims. (Cl. 260—81)

This invention relates to catalyst promotion and more particularly to promotion of stannic chloride catalyst employed in the polymerization of compounds of the indene-coumarone-styrene type.

The use of stannic chloride as a catalyst for polymerizing the polymerizable constituents, e. g., coumarone and indene, present in oils such as solvent naphtha, is well known. While stannic chloride produces resins having certain desirable properties, the polymerization proceeds much more slowly in the presence of this catalyst than in the presence of sulfuric acid catalyst, and stannic chloride is considerably more expensive than sulfuric acid. These disadvantages have greatly restricted commercial use of stannic chloride in paracoumarone resin production.

It is an object of this invention to improve the efficiency of stannic chloride in polymerizing indene, coumarone, styrene and their homologs.

It is another object of the invention to increase the rate of polymerization of paracoumarone resin-forming compounds in the presence of stannic chloride.

It is a further object of the invention to reduce substantially the amount of stannic chloride catalyst required for polymerizing the resin-forming constituents of oils such as coal and water gas tar distillates, drip oils and the like. Other objects and advantages will appear hereinafter.

This invention is based on the discovery that use of small amounts of monocarboxylic acids in conjunction with stannic chloride catalyst greatly increases the activity of the catalyst in polymerizing polymerizable compounds such as indene, coumarone, styrene and their homologs to form solid resin products. The increased activity of the catalyst substantially reduces the time required for resinification of the resin-forming content of a given resin oil as compared with the time required to effect polymerization by the same amount of stannic chloride in the absence of the acid. Further, the promoting effect of the acid permits material reduction of the amount of stannic chloride which would otherwise be required to effect polymerization in a given time.

As promoters, formic and acetic acids are utilized. Acids such as acetic acid tend to corrode metal equipment in the presence of water; the acids are preferably employed in substantially anhydrous condition and the amount of water should not exceed .1% by volume based on the oil.

In carrying out the invention the amount of stannic chloride may vary from .1% to 5%, preferably from .25% to 1%, based on the volume of the resin oil. The amount of acid promoter employed should not exceed 10 grams per liter of the oil and preferably should fall within the range of .5 to 2 grams per liter of the oil. For example, from .025% to .1% by volume of acetic acid based on the volume of the oil and corresponding proportions of formic acid effectively promote stannic chloride catalyst in the polymerization of oils such as coal tar distillate and drip oils containing indene, coumarone, styrene and their homologs. Higher amounts of the acid promoter within the above range are employed when larger amounts of stannic chloride catalyst are utilized; the amount of promoting acid should not exceed 50% by weight based on the stannic chloride. Larger amounts of acid are not advantageous and may seriously depress the activity of the catalyst.

The oil fractions which may be treated in accordance with the invention include oils formed in the distillation of coal and carburetion of water gas, which oils are obtained during the coking of coal, distillation of coal tar or water gas tar, or are collected in coal gas and water gas distribution systems. Solvent naphtha, coke oven light oil, drip oil and water gas tar distillates are representative of such oils. These oils contain varying but substantial amounts, e. g. 3% to 20% by volume, of indene, coumarone, styrene or their homologs such as methylstyrene, methylindene and methylcoumarone, and ordinarily contain mixtures of two or more of such compounds. Various fractions of the oils may contain materially larger proportions of the compounds. Preferably, fractions of such oils boiling within the range of 125° to 235° C., particularly from 150° to 205° C., are utilized. The oils may be more closely fractionated to obtain fractions in which different individual polymerizable compounds predominate. Thus, for example, fractions boiling within the range of 125° to 150° C. ordinarily contain styrene as the chief polymerizable constituent; fractions boiling within the range of 170° to 190° C. contain indene as the chief polymerizable constituent; and fractions boiling intermediate these ranges may contain larger proportions of styrene homologs such as methylstyrene and coumarone together with some styrene and indene. The polymerizable content of drip oil fractions boiling at from 150° to 205° C. is frequently largely indene and methylstyrenes and the polymerizable content of fractions boiling at from 205° to 235° C. may include one or more styrene, coumarone and indene homologs such as 2,4,5-trimethyl styrene, 2,4,6-trimethyl styrene, 1,3-dimethyl indene, o-m-dimethyl coumarone, p-ethyl coumarone, o-p-dimethyl coumarone, m- p-dimethyl coumarone, and 1,2-dimethyl indene. The proportions of the individual polymerizable compounds in the oil depend upon the source of the oil and the particular boiling range of the fraction. Instead of utilizing such oil fractions, substantially pure polymerizable materials, e. g. synthetic indene or synthetic styrene, or mixtures thereof, or their homologs such as methylstyrene or methylindene, may be mixed with an inert solvent such as xylene or other non-polymerizable hydrocarbon to form the resin oil.

The invention may be carried out by introducing the resin oil, stannic chloride catalyst and promoter into a reaction vessel and controlling the temperature of the oil by cooling or heating or by the rate of addition of the reactants so as to produce resin having the desired properties. The reaction is preferably carried out at a substantially constant preselected temperature which may lie within the range of —20° to 100° C. Ordinarily, higher polymers of high melting point and lower oil solubility are formed at lower polymerization temperatures than are produced from the same oil and the same amount of catalyst when the polymerization is carried out at higher temperatures. For example, polymerization temperatures of from 30° to 70° C. may be maintained when it is desired to produce resins of 145° to 160° C. melting point, and the temperature is raised or lowered to produce lower or higher melting point resins, respectively. If desired, the polymerization process may be carried out by introducing the oil containing polymerizable material, catalyst and promoter gradually into a reaction vessel at a rate sufficient to maintain the concentration of the promoter, catalyst and polymerizable material substantially uniform so that polymerization proceeds at a practically constant rate. This procedure facilitates maintenance of the polymerization temperature at a constant desired value.

When the polymerization is complete the catalyst may be removed from the oil by filtration of the oil in the presence of adsorption agents such as infusorial earth, e. g. "Filter-Cel," adsorptive clays, such as "Attapulgus" clay, or aluminum hydroxide. Alternatively, the catalyst may be precipitated by treatment of the oil with basic reagents such as sodium carbonate, caustic alkali, lime, ammonia or amines, e. g. aliphatic amines boiling below 200° C. such as n-butyl amine, or pyridine, and then separated from the oil by filtration, preferably in the presence of a filter aid such as "Filter-Cel." The resin may then be recovered from the oil by conventional methods such as distillation, preferably steam or vacuum distillation, or by precipitation with alcohol.

Where resins of particularly light color are desired the oil may be pretreated to remove color-forming bodies such as dicyclopentadiene prior to polymerization by stannic chloride catalyst. Such pretreatment may be carried out in various ways; for example, pretreatment of the resin oil with dilute, e. g. 50° Bé. sulfuric acid, or heating the oil to effect heat polymerization of a portion of the polymerizable content of the oil results in obtainment of resins of lighter color than when un-pretreated oil is subjected to the action of stannic chloride catalyst and promoter.

The following examples are further illustrative of the invention:

*Example 1.*—The resin oil employed was a carbolic oil fraction having a boiling range of from 125° to 205° C. and containing about 260 grams per liter of polymerizable material, of which 4% (by volume) was styrene, 8% was methylstyrene, 14% was coumarone, 62% was indene, 9% was methylcoumarone, and 3% was methylindene. 900 parts by volume of this fraction were heated in a reaction vessel to 50° C. and 1 gram of glacial acetic acid per liter of the oil was dissolved in the oil. 10 parts by volume of anhydrous stannic chloride (1.1% by volume based on the oil) were dissolved in 50 parts by volume of toluene and the resultant solution was added to the oil. The weight ratio of acetic acid to stannic chloride was about 1:20. The temperature of the oil was maintained at substantially 50° C. until polymerization of the resin-forming constituents of the oil was complete. 25 cc. samples of the oil were analyzed at intervals during the reaction to determine the percentage of resin-forming constituents which had been polymerized.

*Example 2.*—The same procedure and materials were utilized as in Example 1 except that 1 gram of benzoic acid per liter of the oil was employed as the promoter instead of acetic acid.

*Example 3.*—The same procedure and materials were utilized as in Example 1 except that 1 gram of stearic acid per liter of the oil was employed as the promoter instead of acetic acid.

For purposes of comparison the procedure of Examples 1 to 3 was repeated using the same materials except that no promoter for the stannic chloride catalyst was employed. Results of the analysis of the 25 cc. samples of the oil as the polymerization progressed are tabulated below.

| Promoter | Acetic Acid, 1 g./l. | Benzoic Acid, 1 g./l. | Stearic Acid, 1 g./l. | None |
|---|---|---|---|---|
| | Percentage of Resin-forming Constituents of the Oil Polymerized | | | |
| After ½ hour | 70 | 42 | 40 | 7 |
| After 1 hour | 87 | 68 | 58 | 16 |
| After 1½ hours | 93 | 87 | 64 | 39 |
| After 3 hours | 98 | 93 | 77 | 55 |
| After 5 hours | | | 95 | |
| After 6 hours | 100 | | | 64 |
| After 24 hours | | 100 | | 92 |

The blanks in the table indicate the corresponding analyses were not made. It will be observed that use of the acid promoters in conjunction with the stannic chloride resulted in obtainment of as complete polymerization within 5 hours or less as was obtainable with the same amount of stannic chloride without promoter in more than 24 hours.

*Example 4.*—A carbolic hi-flash fraction having a specific gravity of .923 at 20° C., of a boiling range of about 150° to 200° C. and containing 312 grams per liter of polymerizable material, chiefly coumarone and indene, together with minor proportions of styrene, methylstyrene, methyl coumarone and methylindene, was heated to 50° C. and mixed with one gram of benzoic acid and 2.5 cc. of stannic chloride per liter of the oil and the temperature of the oil was maintained at 50° C. for 24 hours. The resin was then separated from the oil by precipitation with methyl alcohol.

Example 4 was repeated using the same materials and procedure except that 5 cc. and 10 cc., respectively, of stannic chloride were utilized as the catalyst. Example 4 was repeated three additional times using the same oil and procedure but utilizing 2.5 cc., 5 cc. and 10 cc., respectively, of stannic chloride catalyst per liter of the oil without any acid promoter. The yields of resin obtained in these experiments are tabulated below.

| Amount of SnCl⁴ cc./liter | Promoter | Resin Yield grams per liter of oil | Resin Yield Percent of theoretical |
|---|---|---|---|
| 2.5 | Yes | 308 | 99 |
| 5 | Yes | 312 | 100 |
| 10 | Yes | 312 | 100 |
| 2.5 | None | 188 | 60 |
| 5 | None | 268 | 86 |
| 10 | None | 287 | 92 |

From the above data it will be evident that the use of promoters in accordance with the invention substantially reduces the amount of stannic chloride catalyst necessary to effect complete polymerization of paracoumarone resin-forming constituents of resin oils.

*Example 5.*—A drip oil fraction boiling within the range of from 125° to 205° C. and containing about 50% by weight of polymerizable material, chiefly styrene, indene and their homologs, including methylstyrenes, was mixed at about 30° C. with .1% by volume of formic acid based on the oil. To the resultant mixture a toluene solution of .5% by volume of anhydrous stannic chloride, based on the oil, was added. The weight ratio of formic acid to stannic chloride was about 1:9. The temperature of the oil rose about 110° C., i. e. to about 140° C., within about 4 minutes, and polymerization of more than 90% of the resin-forming constituents of the oil was accomplished within 2 hours.

Repetition of Example 5 with the same amounts of the same materials except that no promoter was utilized resulted in a much slower rise in temperature of the oil and at least 4 hours were required to effect the same degree of polymerization as was accomplished in the presence of the formic acid promoter within 2 hours.

In order to ascertain the effect of the use of the acid promoters in accordance with the invention on the melting point of the resin, a carbolic oil hi-flash fraction similar to that employed in Example 4 was mixed with 10 cc. of anhydrous stannic chloride and one gram of benzoic acid per liter of the oil and the mixture was maintained at 0° C. for 30 hours. The stannic chloride was then removed by extraction of the oil fraction with water and the benzoic acid by washing with dilute alkali solution. The resin was recovered by steam distillation of the oil. This experiment was repeated using the same materials and procedure except that no promoter was employed. Similar experiments were conducted on the same oil fraction employing polymerization temperatures of 25° C. and 50° C., respectively. The melting points of the resins obtained in these experiments are tabulated below.

| Polymerization temperature °C. | Promoter | Melting Point of Resin °C. |
|---|---|---|
| 0 | Yes | 223 |
| 0 | No | 192 |
| 25 | Yes | 218 |
| 25 | No | 182 |
| 50 | Yes | 162 |
| 50 | No | 149 |

Thus it will be seen the invention provides a process for the effective promotion of stannic chloride catalyst in polymerization of coumarone-indene-styrene type polymerizable constituents present in coke oven tar distillates, water gas tar distillates, drip oils and the like, which process materially increases the activity of the catalyst and permits substantial reduction of the amount of catalyst required to effect complete polymerization of the resin-forming constituents of such oils within a given time, and also reduces the amount of stannic chloride required to polymerize the resin-forming constituents. In this way the promoters facilitate removal of the unsaturated resin-forming constituents from the oils and augment the refining action of the stannic chloride catalyst on the oils. Furthermore, use of the promoters in conjunction with the catalyst results in resins of somewhat higher melting point than are obtainable from the same amount of catalyst without the promoter.

The resin melting points given herein are determined by the cube-in-mercury method described in "Protective and Decorative Coatings," vol. I, copyright 1941, by J. J. Matiello, pages 366–367, published by John A. Wiley & Sons, Inc., New York, New York.

Since certain changes may be made without departing from the scope of the invention, it is intended that the above shall be interpreted as illustrative and not in a limiting sense.

I claim:

1. A process for the production of solid polymeric resinous products which comprises subjecting a non-polymerizable hydrocarbon oil containing at least one polymerizable material selected from the group consisting of indene, coumarone, styrene and their homologs to the polymerizing action of stannic chloride polymerization catalyst in the presence of an amount not exceeding 50% by weight of the stannic chloride of a member of the group consisting of acetic acid and formic acid.

2. A process of producing solid polymeric resinous products which comprises subjecting an oil boiling within the range of 125° to 235° C. and comprising a non-polymerizable aromatic hydrocarbon oil and at least one polymerizable material selected from the group consisting of indene, coumarone, styrene and their homologs to the polymerizing action of from .1% to 5% of stannic chloride catalyst based on the volume of the oil in the presence of an amount not exceeding 50% by weight of the stannic chloride and not more than 10 grams per liter of the oil, of a member of the group consisting of acetic acid and formic acid.

3. A process of producing solid polymeric resinous products from oil fractions boiling within the range of 125° to 235° C. and comprising a non-polymerizable aromatic hydrocarbon oil and at least one member of the group consisting of indene, coumarone, styrene and their homologs, which comprises polymerizing the resin-forming content of the oil by the action of stannic chloride catalyst in the presence of an amount not exceeding 50% by weight of the stannic chloride of a member of the group consisting of acetic acid and formic acid.

4. A process of producing solid paracoumarone resin from oil formed during the distillation of coal, which comprises subjecting a fraction of such oil boiling within the range of 150° to 205° C., which fraction contains indene, to the polymerizing action of substantially anhydrous stannic chloride catalyst in the presence of a substantially anhydrous acid promoter of the group consisting of acetic acid and formic acid, the amount of stannic chloride being within the range of from .25% to 1% based on the volume of the oil and the amount of said acid being within the range of .5 to 2 grams per liter of the oil and not exceeding 50% by weight of the stannic chloride.

5. A process of producing solid paracoumarone resin from oil formed during the carburetion of water gas, which comprises subjecting a fraction of such oil boiling within the range of 150° to 205° C., which fraction contains indene and methylstyrene, to the polymerizing action of substantially anhydrous stannic chloride catalyst in the presence of a substantially anhydrous acid promotor of the group consisting of acetic acid and formic acid, the amount of stannic chloride being within the range of from .25% to 1% based on the volume of the oil and the amount of said acid being within the range of .5 to 2 grams per liter of the oil and not exceeding 50% by weight of stannic chloride.

DAVID F. GOULD.

REFERENCES CITED

The following references are of record in the file of this patent:

UNITED STATES PATENTS

| Number | Name | Date |
|---|---|---|
| 1,770,283 | Ostermayer | July 3, 1930 |
| 2,344,213 | Otto | Mar. 14, 1944 |

FOREIGN PATENTS

| Number | Country | Date |
|---|---|---|
| 544,292 | Germany | Feb. 16, 1932 |

OTHER REFERENCES

Ellis: "Chemistry of Synthetic Resins," pages 95, 102 and 241, Reinhold (1935), vol. I.